United States Patent
Patil et al.

(10) Patent No.: US 12,299,126 B2
(45) Date of Patent: May 13, 2025

(54) PREVENTING ACTIVATION OF MALWARE BY EXHIBITING SANDBOX BEHAVIOR IN A NON-SANDBOX ENVIRONMENT

(71) Applicant: VMware LLC, Palo Alto, CA (US)

(72) Inventors: Rayanagouda Bheemanagouda Patil, Pune (IN); Kedar Bhalchandra Chaudhari, Pune (IN); Clemens Kolbitsch, Goleta, CA (US); Laxmikant Vithal Gunda, San Jose, CA (US); Vaibhav Kulkarni, Pune (IN)

(73) Assignee: VMware LLC, Palo Alto, CA (US)

( * ) Notice: Subject to any disclaimer, the term of this patent is extended or adjusted under 35 U.S.C. 154(b) by 295 days.

(21) Appl. No.: 17/825,684

(22) Filed: May 26, 2022

(65) Prior Publication Data

US 2023/0385413 A1  Nov. 30, 2023

(51) Int. Cl.
*G06F 21/56* (2013.01)
*G06F 21/53* (2013.01)

(52) U.S. Cl.
CPC ............ *G06F 21/566* (2013.01); *G06F 21/53* (2013.01); *G06F 2221/034* (2013.01)

(58) Field of Classification Search
CPC ... G06F 21/566; G06F 21/53; G06F 2221/064
See application file for complete search history.

(56) References Cited

U.S. PATENT DOCUMENTS

| | | | | |
|---|---|---|---|---|
| 9,483,644 | B1* | 11/2016 | Paithane | G06F 16/128 |
| 9,531,740 | B2* | 12/2016 | Martini | G06F 21/53 |
| 10,848,521 | B1* | 11/2020 | Thioux | G06F 21/566 |
| 2013/0097706 | A1* | 4/2013 | Titonis | G06F 21/566 726/22 |
| 2022/0114257 | A1* | 4/2022 | McKerchar | G06F 9/45558 |

OTHER PUBLICATIONS

Unknown, "Sandbox detection and evasion techniques. How malware has evolved over the last 10 years" ptsecurity.com; https://www.ptsecurity.com/ww-en/analytics/antisandbox-techniques/; published Feb. 18, 2021, 15 pages.

* cited by examiner

*Primary Examiner* — Azizul Choudhury
(74) *Attorney, Agent, or Firm* — King Intellectual Asset Management (57) ABSTRACT

The disclosure herein describes executing unknown processes while preventing sandbox-evading malware therein from performing malicious behavior. A process execution event associated with an executable is detected, wherein the executable is to be executed in a production environment. The executable is determined to be an unknown executable (e.g., an executable that has not been analyzed for malware) using signature data in the process execution event. A function call hook interface of a sandbox simulator is activated, and a process of the executable is executed in the production environment. Any function calls from the executing process are intercepted by the activated function call hook interface, and sandbox-style responses to the intercepted function call are generated using sandbox response data of the sandbox simulator. The generated sandbox responses are provided to the executing process, whereby malware included in the executable behaves as if the executing process is executing in a sandbox environment.

20 Claims, 6 Drawing Sheets

PREVENTING ACTIVATION OF MALWARE BY EXHIBITING SANDBOX BEHAVIOR IN A NON-SANDBOX ENVIRONMENT

BACKGROUND

Sandbox-evading malware is a type of malware that is configured to recognize if it is executing in a sandbox environment. When a sandbox environment is detected, the malware refrains from executing malicious code and/or associated operations. By doing so, some sandbox analysis processes determine that the malware is not malicious and allow it to execute outside of the sandbox environment. This kind of malware then detects that it is executing in a production environment (e.g., a non-sandbox environment) and proceeds to execute malicious code. It is challenging to identify such malware in executables and/or processes and it often requires significant amounts of time, human input, and/or processing resources to do so.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for executing unknown processes while preventing sandbox-evading malware therein from performing malicious behavior is described. A process execution event associated with an executable is detected, wherein the executable is to be executed in a production environment. The executable is determined to be an unknown executable (e.g., an executable that has not been analyzed for malware) using signature data in the process execution event. A function call hook interface of a sandbox simulator is activated, and a process of the executable is executed in the production environment. A function call from the executing process is intercepted by the activated function call hook interface, and a sandbox response to the intercepted function call is generated using sandbox response data of the sandbox simulator. The generated sandbox response is provided to the executing process, whereby malware included in the executable behaves as if the executing process is executing in a sandbox environment.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

It has become more difficult to perform signature-based analysis of malicious files by matching suspicious files with known hashes. The same malware is produced many times by making minor modifications in the binary, resulting in a changed hash value. It is also becoming increasingly difficult to conduct static analysis because malware authors are using code obfuscation to impede such attempts. The result is that many executables are unknown or have unknown verdicts at first and must be analyzed using sandboxing analysis as described herein. The disclosure directly addresses the issue of increased sandboxing analysis requirements by enabling executables to be executed prior to completion of such analysis and preventing or delaying malicious behavior by the executing processes.

Aspects of the disclosure provide a computerized method and system for executing unknown processes, while preventing sandbox-evading malware therein from performing malicious behavior. The disclosure enables the unknown processes (e.g., processes for which no malware verdict is available, such that the processes may or may not include malware) to be executed in a production environment or other non-sandbox environment (e.g., immediately) while malicious operations of any sandbox-evading malware there in the processes are either delayed or prevented entirely (e.g., by exploiting the malware's expected sandbox evasion behavior). This is achieved at least by activating a sandbox simulator agent in the production environment that intercepts function calls from the unknown processes and generates responses to the function calls that exhibit, simulate, express, impersonate, mimic, or otherwise indicate sandbox environment behavior. Sandbox-evading malware in such a process is thus "tricked" into remaining inactive to avoid detection in the current environment, which appears to be a sandbox to the malware but is in fact a production environment.

Further, the disclosure includes sending the unknown processes and/or associated executables for malware analysis while those processes are executing in the production environment. When a verdict is received from the malware analysis, the disclosure responds to the verdict by either (1) deactivating the sandbox simulator agent and allowing the processes to continue running when the processes are found to not include malware or (2) halting the processes and/or isolating elements associated with the processes when the processes are found to include malware. In some examples, the malware in the production environment will eventually begin performing malicious operations, so the disclosure is configured to delay performance of these malicious operations, providing additional time for the malware analysis to determine a verdict regarding the presence of malware.

The disclosure operates in an unconventional manner at least by intercepting function calls from an unknown process and generating sandbox responses to the intercepted function calls using sandbox response data, while the unknown process executes in a production environment. Further, the disclosure enables the sandbox simulator agent used to generate the sandbox responses to be dynamically activated and/or deactivated based on whether an executable to be executed is known with respect to malware (e.g., an executable is "known" when a malware verdict has been determined or obtained previously).

These features enable unknown executables and associated processes to be executed immediately without waiting for the malware analysis, thereby saving time if the system would otherwise wait on the malware analysis and/or improving the efficiency and operation of the computing device if the computing device would otherwise prevent the execution and provide notification that the execution has failed. Additionally, the computing device operates efficiently while handling unknown executables in this way because the sandbox simulator agent is actively performing operations only when an unknown process is executing, and the agent is deactivated as soon as a malware verdict is received for the unknown process.

Further, the disclosed methods and systems are configured for flexibility in that the sandbox simulator agent can be trained and/or updated to account for new ways that sandbox-evading malware uses to detect a sandbox environment.

In some examples, sandbox-evading malware can identify new techniques for detecting sandbox environments, but by exhibiting as much sandbox-like behavior as possible, the disclosure "convinces" the malware that it is in a sandbox environment, or at least keeps the malware in a dilemma, where the malware takes more time to evaluate the environment and make a decision regarding the nature of the environment.

Figure 1:
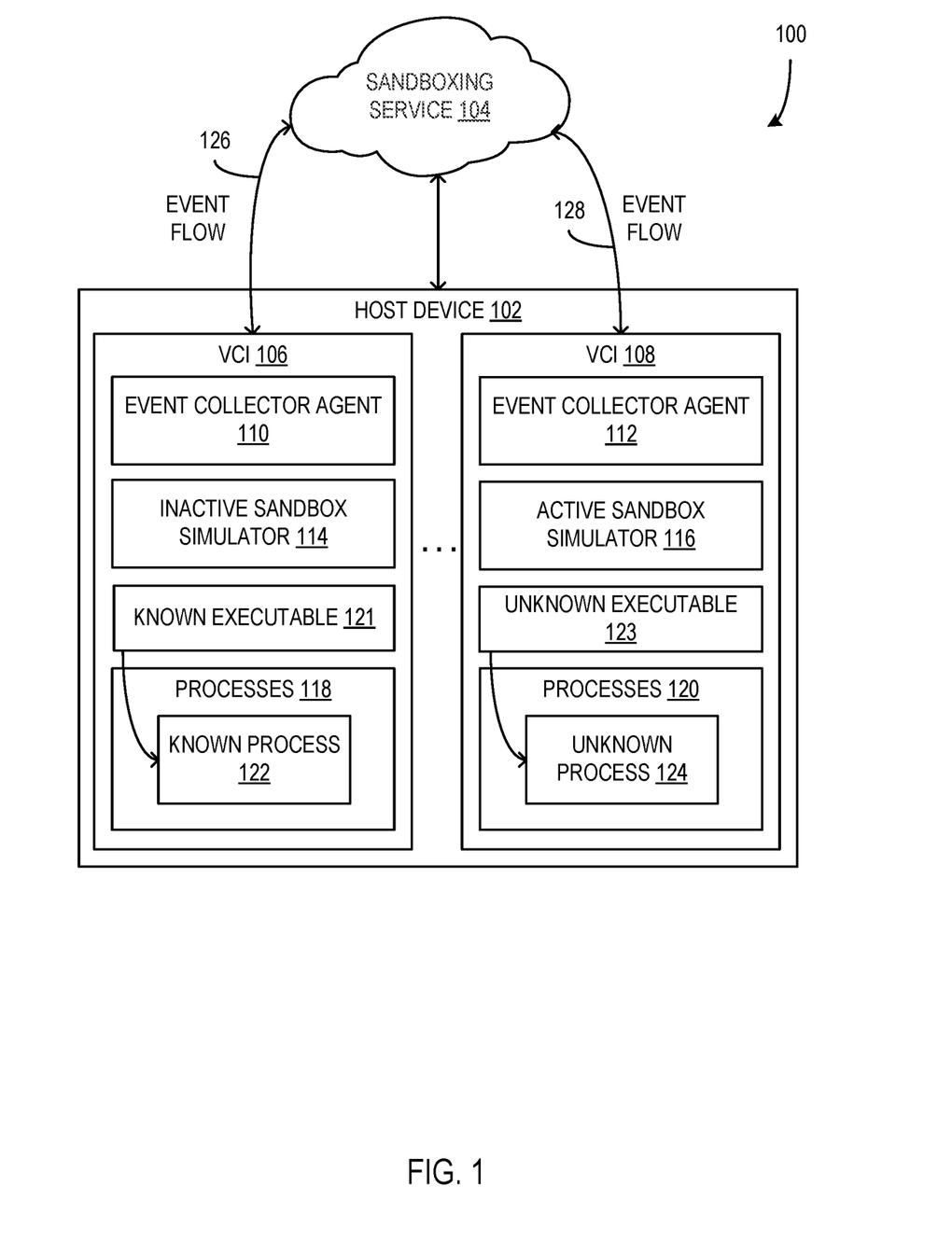
FIG. 1 is a block diagram illustrating a system configured to simulate sandbox environments to prevent sandbox-evading malware in unknown processes from becoming actively malicious.

FIG. 1 is a block diagram illustrating a system 100 configured to simulate sandbox environments using sandbox simulators 114-116 to prevent sandbox-evading malware in unknown processes (e.g., unknown process 124) from becoming actively malicious. The system 100 includes a host device 102 that is in communication with a cloud-based sandboxing service 104. The host device 102 is configured to host virtual computing instances (VCIs) 106-108. In some examples, the VCIs 106-108 include virtual machines (VMs), containers, and/or other types of virtual computing entities.

A sandbox environment is an isolated virtual machine or other computing environment in which potentially unsafe code can be executed without affecting network resources or local applications. In some examples, a sandbox environment is configured to be a replica of a production environment, but it also includes additional applications that enable the environment to observe the operations of an executable that is being analyzed, such as event logging applications, analysis engines, debugger applications, or the like. A non-sandbox environment, such as a production environment, is configured to operate as a computing environment and execute applications and other executables without the enforced isolation of a sandbox environment. Further, in some examples, a non-sandbox environment lacks some or all of the applications used in a sandbox environment for observing the operations of executables therein, such as a debugger application or an analysis engine. Such sandbox-related applications consume processing and data storage resources such that it is not desirable to run them in environments for which such resources are valuable and/or scarce.

While the description often uses the terms 'sandbox environment' and 'production environment' to describe two different types of environments, in other examples, other types of environments are used without departing from the description. For instance, in an example, a system is configured to prevent or otherwise slow malicious behavior of an unknown executable in a first environment by configuring the first environment to provide indications to the unknown executable that it is executing in a second environment. In such an example, if the unknown executable includes malware that is specifically targeted at the first environment (e.g., the malicious operations of the malware are configured to be executed in the first environment) and the malware is configured to remain dormant in other environments that are not the first environment, providing indications to the unknown executable that it is in the second environment may cause the malware of the executable to remain dormant. The environment indications used could include indications of running applications or available services that are specific to the second environment, file structures that are specific to the second environment, or the like.

Each of the VCIs 106-108 includes an event collector agent 110-112, a sandbox simulator 114-116, executables 121 and 123, and any processes 118-120 that are currently being executed thereon. In some examples, processes 118-120 of the VCIs 106-108 include known processes (e.g., known process 122) based on known executables (e.g., known executable 121) and unknown processes (e.g., unknown process 124) based on unknown executables (e.g., unknown executable 123). With respect to malware, a known executable and process have been analyzed and it is known whether the executable and process include malware or not. For instance, known executable 121 and process 122 on VCI 106 are "known" because they have previously been analyzed for malware. Known processes that are free of malware are executed normally on the associated VCI, while known processes that are known to include malware are prevented from being executed. Additionally, or alternatively, known processes with malware are isolated or quarantined, removed from the system, and any necessary remedial operations are performed to ensure that the malware is prevented from affecting the system and/or that any trace of the malware has been removed from the system.

Unknown executables (e.g., executables including executable files, scripts, or other executable entities) and processes such as unknown executable 123 and process 124 have not yet been analyzed for malware. In some examples, unknown processes include processes that are being executed on the system 100 for the first time (e.g., an unknown executable 123 that has not been analyzed is received and scheduled to be executed on the VCI 108). For an unknown process to become known with respect to malware, it and/or its associated unknown executable 123 is analyzed for malware using the sandboxing service 104 and/or one or more other types of malware detection services. Such malware analysis takes time and, in some cases, the execution of an unknown process 124 is time sensitive. In order to enable the VCI 108 to execute the unknown process 124 prior to completion of the malware analysis by the sandboxing service 104, the active sandbox simulator 116 of the VCI 108 interacts with the unknown process 124 to indicate to the unknown process 124 that it is in a sandbox environment rather than a production environment. Because many types of modern malware are configured to refrain from malicious behavior in a sandbox environment to avoid detection, the sandbox simulator 116 works to prevent any malware in the unknown process 124 from performing malicious behavior through simulating sandbox responses as described herein.

The event collector agents 110-112 of the VCIs 106-108 include hardware, firmware, and/or software configured to receive, obtain, and/or otherwise collect event notifications and/or other event data associated with process events that occur on the associated VCI (e.g., event collector agent 110 obtains event data associated with events that occur on VCI 106). In some examples, preparing to execute processes 118-120 from executables triggers a process execution event on the VCI that is obtained by the event collector agent associated therewith. Such a process execution event includes event data that identifies the process to be executed and/or provides other data about the process and/or the execution thereof. Further, in some examples, the event collector agents 110-112 are configured to hook into various kernel and/or Extended Berkeley Packet Filter (eBPF) hooks to monitor application activity on the associated VCIs 106-108.

Further, in some examples, the event collector agent 110 uses the obtained event data to determine whether the executable and/or process to be executed is a known executable and/or process, or an unknown executable and/or process. In some such examples, the event collector agent 110 compares the obtained event data, such as identifier data (e.g., hash data such as Secure Hash Algorithm (SHA) data and/or signature data of the executable), to stored data identifying processes known by the VCI 106 (e.g., in a known executable identifier data cache on the VCI 106). Alternatively, or additionally, the event collector agent 110 sends obtained event data to the sandboxing service 104 via an event flow 126 (e.g., an established line of communication to the sandboxing service 104 via the network connection and/or other type of communication connection between the host device 102 and the sandboxing service 104).

The sandboxing service 104 is configured to determine whether it has analyzed the executable or the associated process before (or whether it has a malware verdict from a previous analysis of the executable stored) based on the event data and provides that determination back to the event collector agent 110 via the event flow 126. In cases where the executable to be executed is a known executable 121, the sandboxing service 104 further includes a verdict or other indication as to whether the known executable 121 includes malware (e.g., a positive verdict indicating that the executable does include malware, or a negative verdict indicating that the executable does not include malware).

Alternatively, in cases where the executable to be executed is an unknown executable 123, the sandboxing service 104 sends the unknown determination to the event collector agent of the VCI (e.g., the event collector agent 112 via the event flow 128). In response to a determination that a process is an unknown executable, the VCI 108 is configured to provide executable and/or associated data to the sandboxing service 104 for malware analysis and to activate the sandbox simulator 116, wherein activation means that the sandbox simulator 116 begins to exhibit sandbox environment behavior to the unknown process 124 as the process 124 executes on the VCI 108.

The sandbox simulators 114-116 of the VCIs 106-108 include hardware, firmware, and/or software configured to exhibit behaviors that are indicative of sandbox environments to unknown processes that are executing on the associated VCIs. In some examples, the sandbox simulators 114-116 are dynamically activated by the VCIs 106-108 and/or the event collector agents 110-112 associated therewith. For instance, if a VCI 106 has only known processes 122 executing, the sandbox simulator 114 is inactive, meaning that it is not operating to exhibit sandbox environment behaviors to any of the processes 118. Alternatively, if a VCI 108 has an unknown process 124 executing, the sandbox simulator 116 is active, meaning that it is operating to exhibit sandbox environment behaviors to at least the unknown process 124 that is executing.

In some such examples, a sandbox simulator 116 is activated when an associated VCI 108 receives a determination that an executable to be executed is an unknown executable 123. After activation of the active sandbox simulator 116, the VCI 108 is configured to execute the unknown process 124 associated with the unknown executable 123 normally while the active sandbox simulator 116 interacts with the executing unknown process 124 to exhibit sandbox environment behavior. Operations of an active sandbox simulator are described in greater detail below with respect to FIG. 2.

Further, in some examples, the sandboxing service 104 is configured to analyze unknown executables 123 and/or processes 124 for the presence of malware as described herein (e.g., based on process data received by the sandboxing service 104 from the associated event collector agent 112 and/or VCI 108 generally). Sandbox analysis includes executing the process in an isolated sandbox environment and/or applying malware analysis policies to the execution of the process, such that the operation of the process can be observed and prevented from maliciously affecting other portions of a production system. Additionally, or alternatively, the sandboxing service 104 is configured to perform other types of static and/or dynamic analysis on unknown processes 124 to determine whether malware is present therein and/or to collect various metrics of evading techniques performed by the process under analysis without departing from the description.

Additionally, or alternatively, the system 100 includes a malware protection system (MPS) that is configured to at least detect queries and/or function calls made by unknown executables 123 running on the system 100 and, based on those detected queries and/or function calls, determine whether the unknown executables 123 are "suspicious", or sufficiently likely to include malware. For instance, known patterns of queries and/or function calls of malware are stored by the MPS and compared to the detected queries and/or function calls of an unknown executable 123. If the queries and/or function calls of the unknown executable 123 sufficiently match the known patterns of malware, the MPS is configured to alert other entities of the system 100 of the likely presence of malware on the unknown executable 123 and/or take additional action against the unknown executable 123, such as halting its operation and/or quarantining it away from other executables, etc.

While the system 100 as illustrated includes the event collector agents, sandbox simulators, and associated processes being executed on VCIs in a host device, in other examples, event collector agents and sandbox simulators are used on other types of computing devices to prevent malicious behavior or malware without departing from the description. For instance, in some examples, the methods as described herein are used on a personal computer, server, and/or other non-virtualized computing system or device.

Further, while the system 100 as illustrated includes two VCIs 106-108 of a single host device 102, in other examples, the system 100 includes more, fewer, or different VCIs and/or host devices without departing from the description.

Figure 2:
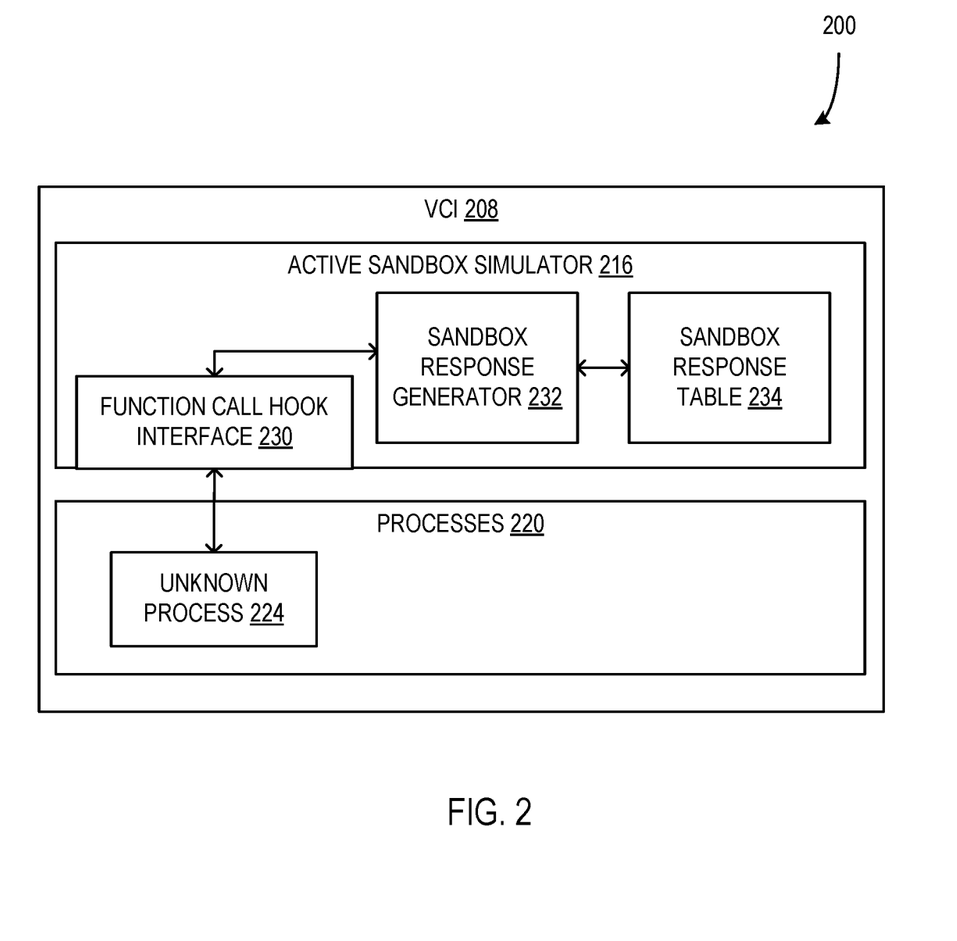
FIG. 2 is a block diagram illustrating a system including a sandbox simulator configured to use a function call hook interface to interact with an unknown process and provide sandbox responses thereto.

FIG. 2 is a block diagram illustrating a system 200 including a sandbox simulator 216 configured to use a function call hook interface 230 to interact with an unknown process 224 and provide sandbox responses thereto. In some examples, the system 200 is included in a system such as system 100 of FIG. 1 as described herein. The VCI 208 includes the active sandbox simulator 216 that is configured to communicate with the unknown process 224 of the processes 220 to exhibit sandbox environment behavior in the form of sandbox responses.

The active sandbox simulator 216 includes a function call hook interface 230 that is configured to hook into function call (e.g., kernel calls) routing in the VCI 208 and intercept function call messages from the unknown process 224. The unknown process 224 (and processes 220 in general) make function calls to software and/or firmware of the VCI 208 (e.g., the operating system (OS)) in order to perform the operations for which they are programmed. In some examples, such function calls include calls to access files, registry information, logs, lists of processes present on the VCI, or the like. Further, the unknown process 224 makes other function calls that make changes to the VCI 208, such as calls to create and/or write to files, calls to register the process with the OS to enable it to provide services for other processes, or the like.

Malware that is sandbox-evading is configured to remain inactive until the unknown process 224 checks one or more states or behaviors of the current environment to determine whether the unknown process 224 is in a sandbox environment or a production or other type of environment. The function call hook interface 230 is configured to specifically intercept those check function calls by the unknown process 224 that may be used by the malware to determine whether it is in a sandbox environment. Upon intercepting such function calls, the sandbox response generator 232 uses sandbox response data stored in the sandbox response table 234 to generate a "sandbox response" that is compatible with the intercepted function call and that is indicative of sandbox environment behavior.

The sandbox response table 234 is a data structure that stores function call responses that are indicative of sandbox environment behavior. Further, the function call responses are stored in association with function calls to which they are compatible, enabling the sandbox response generator 232 to identify a compatible sandbox response by searching for data of the received function call.

In some examples, the sandbox response data 232 is configured to generate a response that is specific to current states of the VCI 208 or the OS thereof in addition to using the response data from the sandbox response table 234. In such examples, the response data in the sandbox response table 234 is genericized, such that it can be used to generate compatible responses to different instances of a function call rather than being a static set of response data that is used for all matching function calls. For instance, if a response to a function call requires a current timestamp to be included, the response data in the sandbox response table 234 includes a tagged portion of the response that is indicative of a current timestamp, indicating to the sandbox response generator 232 that a current timestamp should be inserted in the tagged portion of the response such that the response includes the dynamic information reflective of the current time at which the function call is received. Other types of dynamic information that is generated and inserted by the sandbox response generator 232 into function call responses include information about the current state of the OS and/or other processes on the VCI 208, information about current files stored on the VCI 208, or the like.

Figure 3:
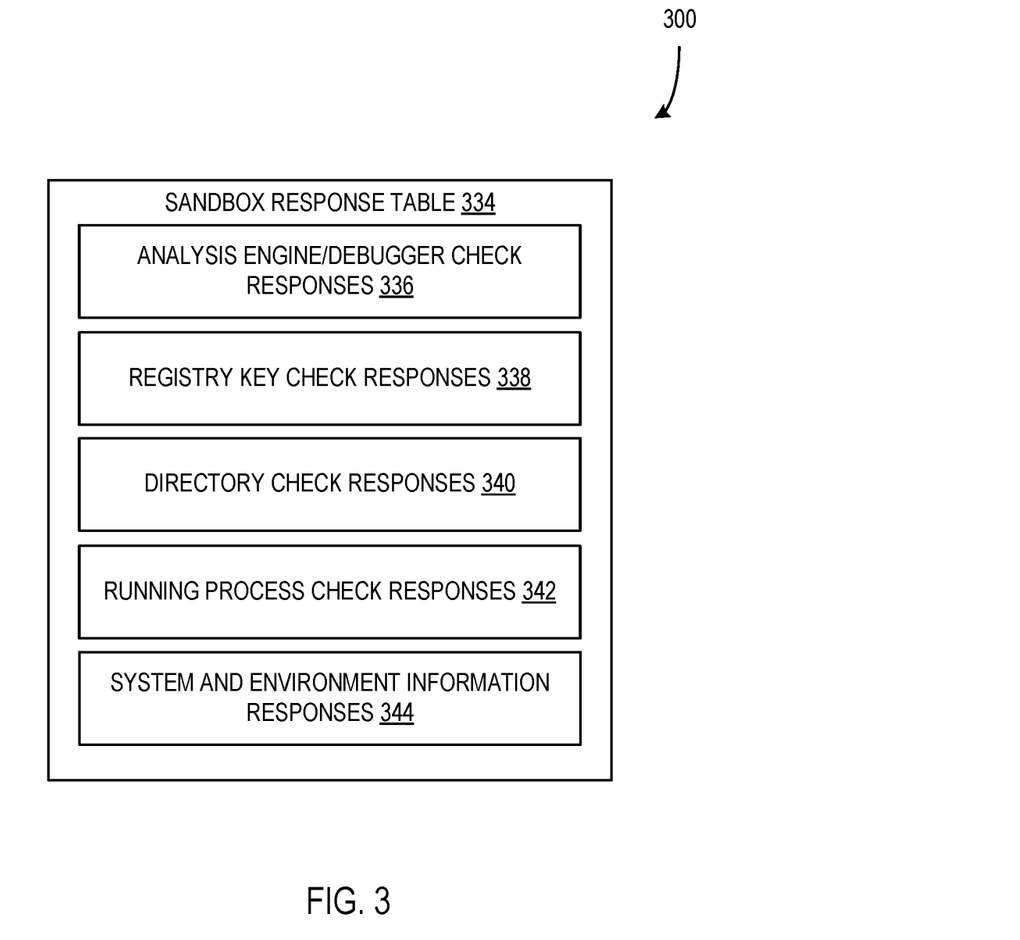
FIG. 3 is a block diagram illustrating a system including a sandbox response table configured to store responses that mimic behavior of a sandbox environment.

FIG. 3 is a block diagram illustrating a system 300 including a sandbox response table 334 configured to store responses 336-344 that mimic behavior of a sandbox environment. In some examples, the system 300 is part of a system such as systems 100 and 200 of FIGS. 1 and 2, respectively. The stored responses include analysis engine/debugger check responses 336, registry key check responses 338, directory check responses 340, running process check responses 342, and system and environment information responses 344.

The analysis/debugger check responses 336 are configured to provide responses to checks for analysis engines and/or debuggers that are indicative of sandbox environment behavior. In many sandbox environments, analysis engines and/or debuggers are executed to enable the sandbox analysis process. Even if such analysis engines and/or debuggers are not present in a production environment of a VCI with which the sandbox response table 334 is associated, the responses 336, when provided to an unknown process, indicate that there are one or more analysis engines and/or debuggers present on the system. In some such examples, using the responses 336 includes loading 'dummy' modules that will indicate that analysis engines and/or debuggers are currently running. Dynamically linked libraries, or dynamic link libraries, (DLLs) associated with such modules can also be included in the OS image/template used in live environments (e.g., a known type of malware, ROKRAT, checks whether the SbieDLL.dll, Dbghelp.dll, Api_log.dll, and/or Dir_watch.dll libraries are loaded, which are associated with analysis engines and/or debuggers).

The registry key check responses 338 are configured to provide responses to checks of the registry that are indicative of sandbox environment behavior. In many sandbox environments, the registry entries reflect aspects of sandbox environments that are generally not present in production environments (e.g., certain registry keys that indicate the environment is virtualized). When unknown processes check for such registry entries, the registry key check responses 338 are used to modify registry call responses to include references that are indicative of a sandbox environment. By including these references, the modified response exhibits a system state that is more likely to be a sandbox environment.

The directory check responses 340 are configured to provide responses to checks on file directories that are indicative of sandbox environment behavior. In many sandbox environments, malware detection tools include files stored in the file directory of the system, enabling malware to detect the presence of such tools from the file directory. In some examples, using the directory check responses 340 includes creating 'dummy' files in the directory check response that are indicative of the presence of one or more malware detection tools.

The running process check responses 342 are configured to provide responses to checks of currently running processes that are indicative of sandbox environment behavior. In many sandbox environments, monitoring software, malware detection engines, debuggers, Sysinternal tools, virtualization related processes, or the like are running to enable the sandbox analysis process. In some examples, using the running process check responses 342 includes inserting indicators of one or more of such processes into responses to process check functions and/or spawning 'dummy' processes on the system that are indicative of sandbox environment behavior. Further, in some examples, malware (e.g., Remcos) checks specifically for debuggers using an 'IsDebuggerPresent' call or the like, which can be responded to by invoking an actual debugger process, a 'do-nothing' debugger process, or by inserting an indication of a debugger being present in the response to the call.

The system and/or environment information responses 344 are configured to provide responses to checks associated with system and/or environment configuration. Such information is obtained from the registry as well as OS interfaces and other system APIs. In some examples, malware does environment checks for obtaining hardware and system characteristics. Such checks include checks for running in a virtual environment, checks associated with BIOS data, manufacturer information, quantity of CPUs or other components, quantity of memory or the like. In other examples, more, fewer, or different system and/or environment information responses 344 are provided without departing from the description.

In some examples, the interception of function calls from unknown processes and generation of sandbox responses as described herein are done dynamically, only when the process being executed is unknown. The sandbox simulators and/or event collector agents are also configured to stop intercepting function calls and generating sandbox responses when a verdict is received for the unknown process, at which point the process becomes a "known process". This dynamic activation and deactivation of the sandbox simulators enables efficient use of resources of the VCIs for operating the sandbox simulators.

Further, in some examples, technologies (e.g., VMWARE App Volumes Manager) are leveraged to attach debugging tools and/or other sandbox-related applications to the VCI when an unknown process is going to execute on the VCI. Such attached applications are configured to further exhibit sandbox environment behaviors that are targets for check function calls by malware processes. For instance, if a malware application performs an executive search for such sandbox-related applications in environment or registry entries, the malware application detects the sandbox-related applications and is more likely to refrain from performing malicious operations due to indications that it is executing in a sandbox environment.

Additionally, or alternatively, the event collector agents and/or sandbox simulators are configured to learn new types of sandbox responses and/or associated operations that exhibit sandbox environment behavior based on data obtained from associated sandboxing services (e.g., sandboxing service 104). In some such examples, data associated operations of a sandboxing service and/or interactions with processes during sandbox analysis is used as training data to train a model to generate new types of sandbox responses or other behaviors using machine learning techniques. For instance, function calls made by a process in a sandbox environment and responses provided by the sandbox environment during analysis are recorded and used as training data. In some examples, training data from analyses during which the process is found to include malware are prioritized, as that training data is likely to include one or more check function calls from the process that can be used by the sandbox simulator to exhibit sandbox behavior via a compatible sandbox response.

Further, in some examples, the responses of the sandbox response table 334 include at least one of the following: responses that indicate that there is no user interacting with the environment (e.g., blocking responses that might indicate a user is using the environment, which indicates that it is likely the environment is a non-sandbox environment); responses indicating system characteristics that reflect typical sandbox configurations, such as CPU core count, digital system signatures, installed programs, operating system reboots, hardware components, and/or system artifacts; responses indicating the presence of usernames that are sandbox-related; and responses indicating hypervisor calls are occurring that are typical of sandbox environments.

Figure 4:
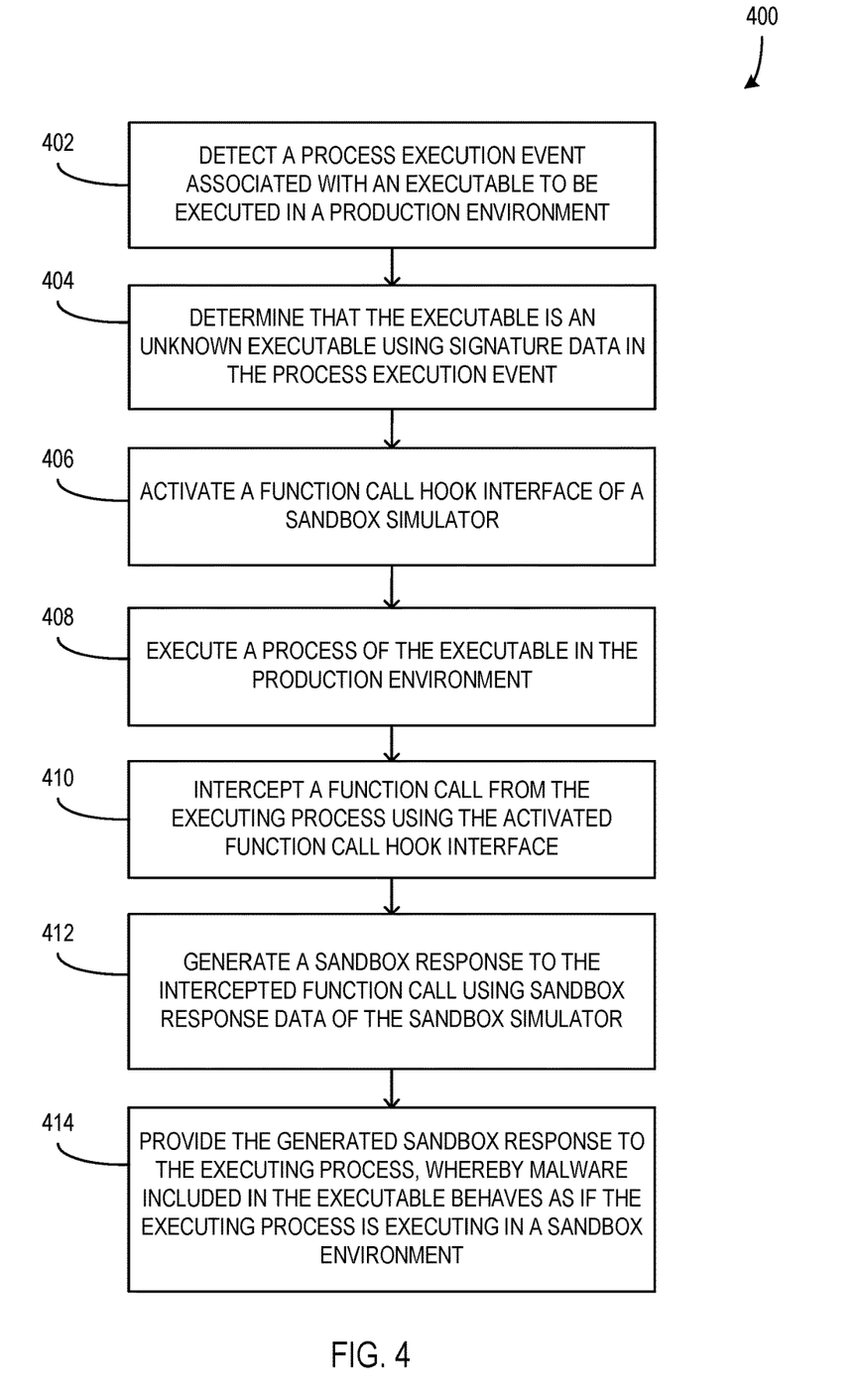
FIG. 4 is a flowchart illustrating a method for exhibiting sandbox environment behavior to an unknown process using a sandbox simulator.

FIG. 4 is a flowchart illustrating a method 400 for exhibiting sandbox environment behavior to an unknown process using a sandbox simulator. In some examples, the method 400 is performed in a system such as systems 100, 200, and 300 of FIGS. 1, 2, and 3, respectively.

At 402, a process execution event is detected that is associated with an executable to be executed in a production environment. In some examples, the process execution event is detected by an event collector agent (e.g., event collector agent 110 or 112). The executable is an executable file, script, and/or other entity that can be executed using a processor of a computing device (e.g., a VCI such as VCI 106 or 108). The process execution event is triggered prior to the execution of the executable based on instructions indicating that the executable should be executed.

The production environment in which the executable is to be executed is a computing environment that is configured for normal use, including executing applications, creating, reading, and/or editing files, communicating with other computing devices via network connections, or the like. In most examples, the production environment is not a specialized environment configured specifically to detect and/or interact with malware in a preventative manner. A sandbox environment is one which is configured specifically to observe the operations of processes with a goal of detecting malware and preventing it from becoming malicious in other production environments. A sandbox environment is further configured to execute processes in isolation, preventing malware from coming into contact with important files or data of other environments and/or from interacting with other computing devices. In other examples, the described systems and methods are used in other types of environments that are not sandbox environments without departing from the description.

At 404, it is determined that the executable is an unknown executable using signature data in the process execution event. In some examples, the signature data includes a hash value of the executable that is compared to a stored set of known executables (e.g., at the VCI or computing device upon which the method 400 is running and/or at another device such as a device associated with a sandboxing service 104). If the signature data is not present in the set of known executables, it is determined that the executable is unknown.

At 406, a function call hook interface of a sandbox simulator is activated. In some examples, the function call hook interface is configured to hook into at least a subset of function call routes of the OS of the VCI or computing device.

At 408, a process of the executable is executed in the production environment and, at 410, a function call from the executing process is intercepted using the function call hook interface. In some examples, the function call hook interface is configured to intercept a subset of function calls from the executing process, wherein the subset of function calls includes function calls for which the sandbox simulator is configured to generate sandbox responses as described herein. In some such examples, the subset of function calls includes function calls that are known to be made by malware processes to determine whether the process is running in a production environment or a sandbox environment.

At 412, a sandbox response to the intercepted function call is generated using sandbox response data of the sandbox simulator (e.g., data from the sandbox response table 234). In some examples, generating the response includes generating or otherwise obtaining a response to the function call that would normally be provided in response to the function call and adjusting the response using the sandbox response data to cause the response to exhibit sandbox environment behavior.

In some examples, the generated sandbox response includes at least one of the following: an analysis engine check response, a debugger check response, a registry key check response, a directory check response, a running process check response, and a system and/or environment information check response as described herein with respect to FIG. 3. Additionally, or alternatively, in some examples, generating the sandbox response includes performing at least one of the following operations: loading a DLL indicative of a sandbox environment, creating a running process indicative of a sandbox environment, creating a file indicative of a sandbox environment, and running a debugger process indicative of a sandbox environment, wherein the generated sandbox response includes data associated with the performed operation.

At 414, the generated sandbox response is provided to the executing process, whereby malware included in the executable behaves as if the executing process is executing in a sandbox environment.

Figure 5:
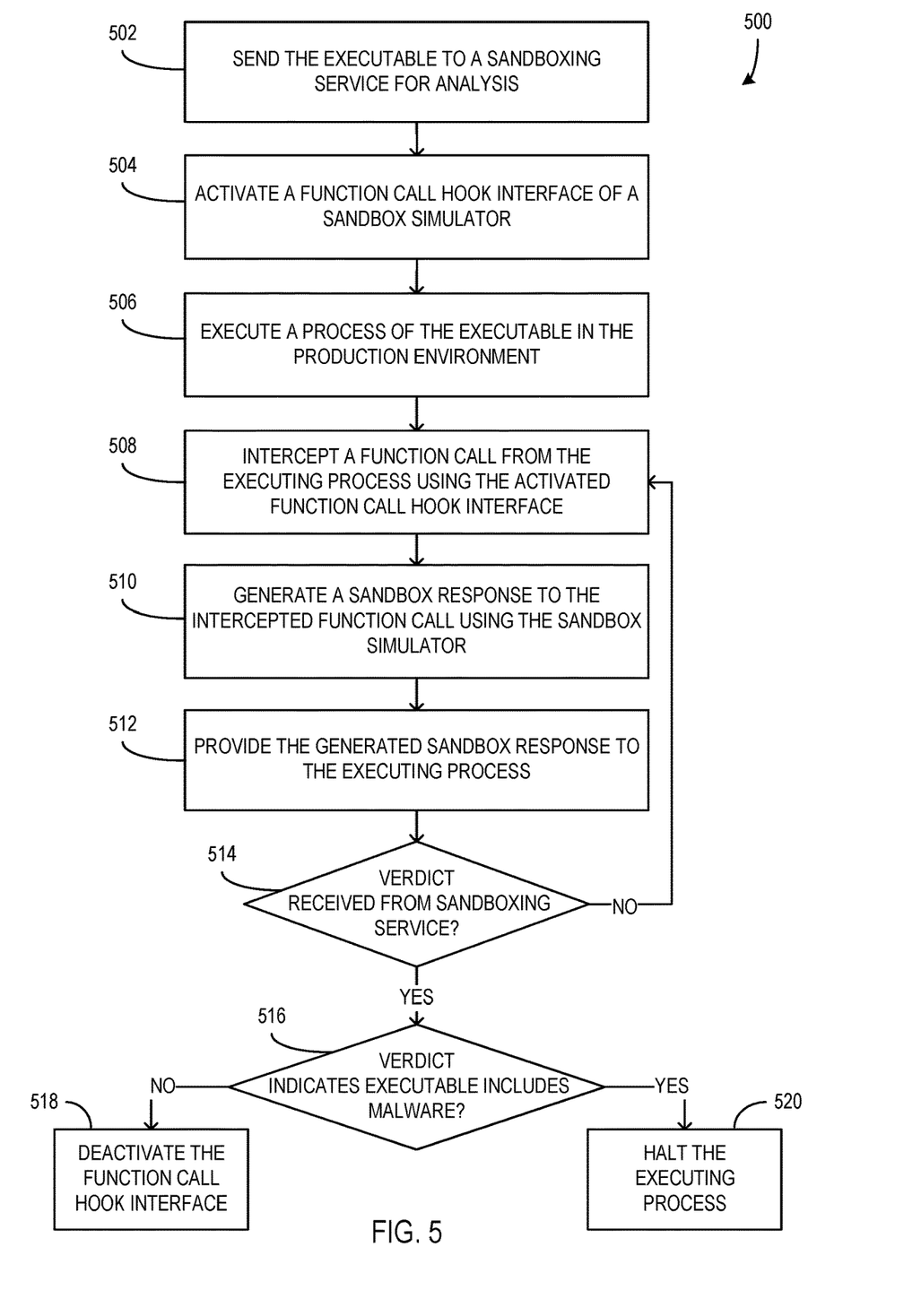
FIG. 5 is a flowchart illustrating a method for exhibiting sandbox environment behavior to an unknown process until a verdict is obtained from a sandboxing service.

FIG. 5 is a flowchart illustrating a method 500 for exhibiting sandbox environment behavior to an unknown process until a verdict is obtained from a sandboxing service. In some examples, the method 500 is performed in a system such as systems 100, 200, and 300 of FIGS. 1, 2, and 3, respectively. Further, in some example, the method 500 is executed or otherwise performed as part of a method such as method 400 of FIG. 4. For instance, in an example, the method 500 is performed after determining that the executable is an unknown executable at 404 of FIG. 4 as described above.

At 502, the executable is sent to a sandboxing service (e.g., sandboxing service 104) for analysis. Additionally, or alternatively, in some examples, the executable is sent to one or more other types of malware detection services for analysis. At 504, a function call hook interface of a sandbox simulator is activated and, at 506, a process of the executable is executed in the production environment. Then, a function call from the executing process is intercepted using the activated function call hook interface during execution of the process.

At 510, a sandbox response to the intercepted function call is generated using the sandbox simulator and, at 512, the generated sandbox response is provided to the executing process, indicating to the process that the current environment is a sandbox environment. It should be understood that, in some examples, 504-512 are performed in substantially the same manner as 406-414 of FIG. 4 as described above.

At 514, if a verdict of the executable is received from the sandboxing service, the process proceeds to 516. Alternatively, if no verdict has been received from the sandboxing service, the process returns to 508 to continue intercepting function calls from the executing process.

At 516, if the verdict indicates that the executable does not include malware, the process proceeds to 518. Alternatively, if the verdict indicates that the executable does include malware, the process proceeds to 520.

At 518, because the executable of the executing process is found to not include malware, the function call hook interface of the sandbox simulator is deactivated. As a result, the executing process is allowed to continue executing normally without any function calls being intercepted by the sandbox simulator.

At 520, because the executable of the executing process is found to include malware, the executing process is halted. In some examples, halting the executing process further includes removing the process and executable from memory, quarantining, or otherwise isolating the process and executable, or taking other actions to prevent the malware from maliciously affecting the production environment and/or the associated VCI or computing device. Further, in some examples, actions are taken to reverse any changes made by the process (e.g., respawning processes that were ended by the malware process, returning data values to their original states, or the like) in the production environment and/or the associated VCI or computing device. Additionally, or alternatively, actions taken in response to finding malware include suspending the computing instance upon which the malware is executing and/or isolating the computing instance by means of firewall rules for forensic analysis and blocking any further network access.

Exemplary Operating Environment

Figure 6:
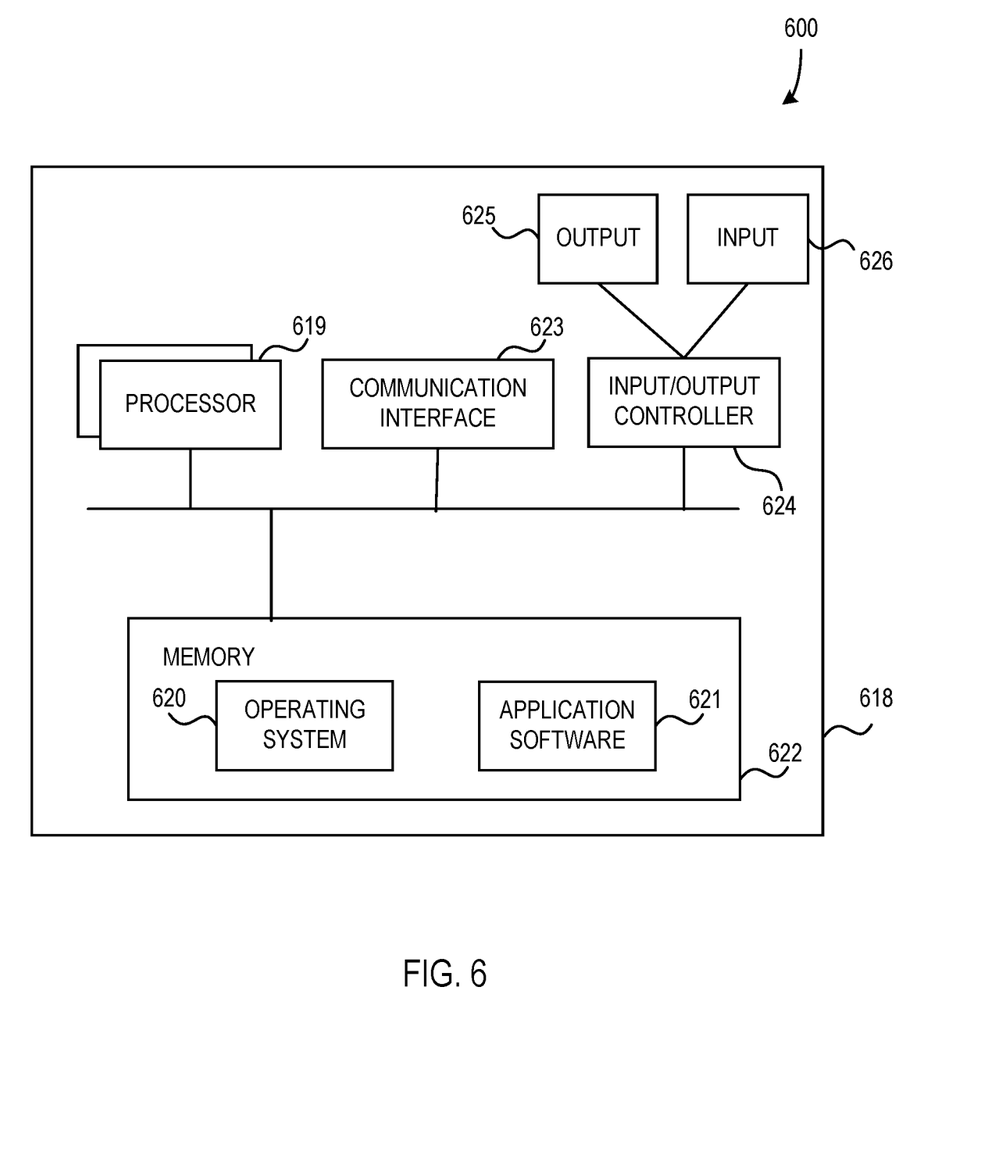
FIG. 6 illustrates an example computing apparatus as a functional block diagram.

The present disclosure is operable with a computing apparatus according to an embodiment as a functional block diagram 600 in FIG. 6. In an example, components of a computing apparatus 618 are implemented as a part of an electronic device according to one or more embodiments described in this specification. The computing apparatus 618 comprises one or more processors 619 which may be microprocessors, controllers, or any other suitable type of processors for processing computer executable instructions to control the operation of the electronic device. Alternatively, or in addition, the processor 619 is any technology capable of executing logic or instructions, such as a hard-coded machine. In some examples, platform software comprising an operating system 620 or any other suitable platform software is provided on the apparatus 618 to enable application software 621 to be executed on the device. In some examples, the executing of unknown processes while preventing sandbox-evading malware therein from performing malicious behavior as described herein is accomplished by software, hardware, and/or firmware.

In some examples, computer executable instructions are provided using any computer-readable media that are accessible by the computing apparatus 618. Computer-readable media include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that, in some examples, the storage is distributed or located remotely and accessed via a network or other communication link (e.g., using a communication interface 623).

Further, in some examples, the computing apparatus 618 comprises an input/output controller 624 configured to output information to one or more output devices 625, for example a display or a speaker, which are separate from or integral to the electronic device. Additionally, or alternatively, the input/output controller 624 is configured to receive and process an input from one or more input devices 626, for example, a keyboard, a microphone, or a touchpad. In one example, the output device 625 also acts as the input device. An example of such a device is a touch sensitive display. The input/output controller 624 may also output data to devices other than the output device, e.g., a locally connected printing device. In some examples, a user provides input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprising: at least one processor of a host device; and at least one memory comprising computer program code, the at least one memory and the computer program code configured to, with the at least one processor, cause the at least one processor to: detect a process execution event associated with an executable to be executed in a production environment; determine that the executable is an unknown executable using signature data in the process execution event; activate a function call hook interface of a sandbox simulator; execute a process of the executable in the production environment; intercept a function call from the executing process using the activated function call hook interface; generate, by the sandbox simulator, a sandbox response to the intercepted function call using sandbox response data of the sandbox simulator; and provide the generated sandbox response to the executing process, whereby malware included in the executable behaves as if the executing process is executing in a sandbox environment.

An example computerized method comprises: detecting, by a processor, a process execution event associated with an executable to be executed in a production environment; determining, by the processor, that the executable is an unknown executable using signature data in the process execution event; activating, by the processor, a function call hook interface of a sandbox simulator; executing, by the processor, a process of the executable in the production environment; intercepting, by the processor, a function call from the executing process using the activated function call hook interface; generating, by the processor using the sandbox simulator, a sandbox response to the intercepted function call using sandbox response data of the sandbox simulator; and providing, by the processor, the generated sandbox response to the executing process, whereby malware included in the executable behaves as if the executing process is executing in a sandbox environment.

One or more computer storage media have computer-executable instructions that, upon execution by a processor, cause the processor to at least: detect a process execution event associated with an executable to be executed in a production environment; determine that the executable is an unknown executable using signature data in the process execution event; activate a function call hook interface of a sandbox simulator; execute a process of the executable in the production environment; intercept a function call from the executing process using the activated function call hook interface; generate, by the sandbox simulator, a sandbox response to the intercepted function call using sandbox response data of the sandbox simulator; and provide the generated sandbox response to the executing process, whereby malware included in the executable behaves as if the executing process is executing in a sandbox environment.

Alternatively, or in addition to the other examples described herein, examples include any combination of the following:

further comprising sending the executable to a sandboxing service based on determining that the executable is unknown, whereby the sandboxing service is enabled to perform malware analysis on the executable in a sandbox environment.

further comprising sending the executable to a malware detection service based on determining that the executable is unknown, whereby the malware detection service is enabled to perform malware analysis on the executable further comprising: receiving a verdict associated with the executable from the sandboxing service, the verdict indicating that the executable does not include malware; and deactivating the function call hook interface of the sandbox simulator, whereby function calls from the executing process are not intercepted by the function call hook interface.

further comprising: receiving a verdict associated with the executable from the sandboxing service, the verdict indicating that the executable includes malware; and halting the executing process of the executable.

wherein the generated sandbox response includes at least one of the following: an analysis engine check response, a debugger check response, a registry key check response, a directory check response, a running process check response, and a system and/or environment information check response.

wherein generating, by the sandbox simulator, the sandbox response to the intercepted function call using sandbox response data of the sandbox simulator further includes: performing at least one of the following operations: loading a dynamically linked library (DLL) indicative of a sandbox environment, creating a running process indicative of a sandbox environment, creating a file indicative of a sandbox environment, and running a debugger process indicative of a sandbox environment; and wherein the generated sandbox response includes data associated with the performed at least one operation.

wherein the production environment is located on a Virtual Computing Instance (VCI) of a host device and the sandbox simulator is executed on the VCI.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for detecting, by a processor, a process execution event associated with an executable to be executed in a production environment; exemplary means for determining, by the processor, that the executable is an unknown executable using signature data in the process execution event; exemplary means for activating, by the processor, a function call hook interface of a sandbox simulator; exemplary means for executing, by the processor, a process of the executable in the production environment; exemplary means for intercepting, by the processor, a function call from the executing process using the activated function call hook interface; exemplary means for generating, by the processor using the sandbox simulator, a sandbox response to the intercepted function call using sandbox response data of the sandbox simulator; and exemplary means for providing, by the processor, the generated sandbox response to the executing process, whereby malware included in the executable behaves as if the executing process is executing in a sandbox environment.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
at least one processor of a host device; and
at least one memory comprising computer program code, the at least one memory and the computer program code configured to, with the at least one processor, cause the at least one processor to:
detect a process execution event associated with an executable to be executed in a production environment;
determine, using signature data in the process execution event, that the executable is an unknown executable;
activate a function call hook interface of a sandbox simulator;
execute a process of the executable in the production environment;
intercept a function call from the executing process using the activated function call hook interface;
generate, by the sandbox simulator, a sandbox response to the intercepted function call using sandbox response data of the sandbox simulator; and
provide the generated sandbox response to the executing process, whereby malware included in the executable behaves as if the executing process is executing in a sandbox environment based on the provided sandbox response.

2. The system of claim 1, wherein the at least one memory and the computer program code are configured to, with the at least one processor, further cause the at least one processor to send the executable to a malware detection service based on determining that the executable is unknown, whereby the malware detection service is enabled to perform malware analysis on the executable.

3. The system of claim 2, wherein the at least one memory and the computer program code are configured to, with the at least one processor, further cause the at least one processor to:
receive a verdict associated with the executable from the sandboxing service, the verdict indicating that the executable does not include malware; and
deactivate the function call hook interface of the sandbox simulator, whereby function calls from the executing process are no longer intercepted by the function call hook interface.

4. The system of claim 2, wherein the at least one memory and the computer program code are configured to, with the at least one processor, further cause the at least one processor to:
receive a verdict associated with the executable from the sandboxing service, the verdict indicating that the executable includes malware; and
halt the executing process of the executable.

5. The system of claim 1, wherein the generated sandbox response includes at least one of the following: an analysis engine check response, a debugger check response, a registry key check response, a directory check response, a running process check response, and a system and/or environment information check response.

6. The system of claim 1, wherein generating, by the sandbox simulator, the sandbox response to the intercepted function call using sandbox response data of the sandbox simulator further includes:
performing at least one of the following operations: loading a dynamically linked library (DLL) indicative of a sandbox environment, creating a running process indicative of a sandbox environment, creating a file indicative of a sandbox environment, and running a debugger process indicative of a sandbox environment; and
wherein the generated sandbox response includes data associated with the performed at least one operation.

7. The system of claim 1, wherein the production environment is located on a virtual computing instance (VCI) of a host device and the sandbox simulator is executed on the VCI.

8. A computerized method comprising:
detecting, by a processor, a process execution event associated with an executable to be executed in a production environment;
determining, by the processor using signature data in the process execution event, that the executable is an unknown executable;
activating, by the processor, a function call hook interface of a sandbox simulator;
executing, by the processor, a process of the executable in the production environment;
intercepting, by the processor, a function call from the executing process using the activated function call hook interface;
generating, by the processor using the sandbox simulator, a sandbox response to the intercepted function call using sandbox response data of the sandbox simulator, and
providing, by the processor, the generated sandbox response to the executing process, whereby malware included in the executable behaves as if the executing process is executing in a sandbox environment based on the provided sandbox response.

9. The computerized method of claim 8, further comprising sending the executable to a malware detection service based on determining that the executable is unknown, whereby the malware detection service is enabled to perform malware analysis on the executable.

10. The computerized method of claim 9, further comprising:
receiving a verdict associated with the executable from the sandboxing service, the verdict indicating that the executable does not include malware; and
deactivating the function call hook interface of the sandbox simulator, whereby function calls from the executing process are no longer intercepted by the function call hook interface.

11. The computerized method of claim 9, further comprising:
receiving a verdict associated with the executable from the sandboxing service, the verdict indicating that the executable includes malware; and
halting the executing process of the executable.

12. The computerized method of claim 8, wherein the generated sandbox response includes at least one of the following: an analysis engine check response, a debugger check response, a registry key check response, a directory check response, a running process check response, and a system and/or environment information check response.

13. The computerized method of claim 8, wherein generating, by the sandbox simulator, the sandbox response to the intercepted function call using sandbox response data of the sandbox simulator further includes:
  performing at least one of the following operations: loading a dynamically linked library (DLL) indicative of a sandbox environment, creating a running process indicative of a sandbox environment, creating a file indicative of a sandbox environment, and running a debugger process indicative of a sandbox environment; and
  wherein the generated sandbox response includes data associated with the performed at least one operation.

14. The computerized method of claim 8, wherein the production environment is located on a virtual computing instance (VCI) of a host device and the sandbox simulator is executed on the VCI.

15. One or more computer storage media of a host device having computer-executable instructions that, upon execution by a processor, cause the processor to at least:
  detect a process execution event associated with an executable to be executed in a production environment;
  determine, using signature data in the process execution event, that the executable is an unknown executable;
  activate a function call hook interface of a sandbox simulator;
  execute a process of the executable in the production environment;
  intercept a function call from the executing process using the activated function call hook interface;
  generate, by the sandbox simulator, a sandbox response to the intercepted function call using sandbox response data of the sandbox simulator; and
  provide the generated sandbox response to the executing process, whereby malware included in the executable behaves as if the executing process is executing in a sandbox environment based on the provided sandbox response.

16. The one or more computer storage media of claim 15, wherein the computer-executable instructions, upon execution by a processor, further cause the processor to at least:
  send the executable to a sandboxing service based on determining that the executable is unknown, whereby the sandboxing service is enabled to perform malware analysis on the executable in a sandbox environment.

17. The one or more computer storage media of claim 16, wherein the computer-executable instructions, upon execution by a processor, further cause the processor to at least:
  receive a verdict associated with the executable from the sandboxing service, the verdict indicating that the executable does not include malware; and
  deactivate the function call hook interface of the sandbox simulator, whereby function calls from the executing process are no longer intercepted by the function call hook interface.

18. The one or more computer storage media of claim 16, wherein the computer-executable instructions, upon execution by a processor, further cause the processor to at least:
  receive a verdict associated with the executable from the sandboxing service, the verdict indicating that the executable includes malware; and
  halt the executing process of the executable.

19. The one or more computer storage media of claim 15, wherein the generated sandbox response includes at least one of the following: an analysis engine check response, a debugger check response, a registry key check response, a directory check response, a running process check response, and a system and/or environment information check response.

20. The one or more computer storage media of claim 15, wherein generating, by the sandbox simulator, the sandbox response to the intercepted function call using sandbox response data of the sandbox simulator further includes:
  performing at least one of the following operations: loading a dynamically linked library (DLL) indicative of a sandbox environment, creating a running process indicative of a sandbox environment, creating a file indicative of a sandbox environment, and running a debugger process indicative of a sandbox environment; and
  wherein the generated sandbox response includes data associated with the performed at least one operation.

* * * * *